United States Patent [19]

Newell et al.

[11] Patent Number: 4,619,029

[45] Date of Patent: Oct. 28, 1986

[54] METHOD OF RETROFITTING A HAMMER MILL ROTOR

[75] Inventors: Alton S. Newell; A. Scott Newell, Jr.; Paul D. Popovich; John R. Ewing, all of San Antonio, Tex.

[73] Assignee: Newell Industries, Inc., San Antonio, Tex.

[21] Appl. No.: 709,182

[22] Filed: Mar. 7, 1985

Related U.S. Application Data

[62] Division of Ser. No. 354,286, Mar. 3, 1982, Pat. No. 4,504,019.

[51] Int. Cl.[4] .......................... B23P 7/00; B23P 19/04

[52] U.S. Cl. ............................... 29/402.05; 29/402.08

[58] Field of Search ........... 29/402.03, 402.04, 402.05, 29/402.06, 402.08; 241/189 R, 191, 197, 300

[56] References Cited

U.S. PATENT DOCUMENTS

| | | |
|---|---|---|
| 12,659 | 6/1807 | Williams . |
| 589,236 | 8/1897 | Williams . |
| 2,781,176 | 2/1957 | Clark . |
| 3,482,788 | 12/1969 | Newell . |
| 3,482,789 | 12/1969 | Newell . |
| 3,489,078 | 1/1970 | Oberhellmann . |
| 3,545,690 | 12/1970 | Burian et al. . |
| 3,727,848 | 4/1973 | Francis . |
| 3,738,586 | 6/1973 | Fabert, Jr. . |
| 3,844,494 | 10/1974 | Hightower . |
| 3,880,366 | 4/1975 | Loevenich . |
| 4,056,232 | 11/1977 | Linnerz et al. . |
| 4,146,184 | 3/1979 | Whitney . |
| 4,214,616 | 7/1980 | Brisson . |
| 4,313,575 | 2/1982 | Stepanek . |
| 4,424,938 | 1/1984 | Day . |

FOREIGN PATENT DOCUMENTS

| | | |
|---|---|---|
| 2225916 | 2/1978 | Fed. Rep. of Germany . |

*Primary Examiner*—Howard N. Goldberg
*Assistant Examiner*—Timothy V. Eley
*Attorney, Agent, or Firm*—Gunn, Lee & Jackson

[57] ABSTRACT

A hammer mill for treating scrap metal including a rotary hammer means for delivering impact blows to scrap metal is shown. Discharge grates are provided for disposing of the scrap metal through discharge outlets for the hammer mill. The rotor is a disc type with rotating hammers located on pins extending through the discs. A plurality of caps are circumferentially located around each disc and attached thereto for protecting the disc against excessive wear. A dual feed roller feeds the scrap metal to the hammer mill to be shredded.

13 Claims, 10 Drawing Figures

METHOD OF RETROFITTING A HAMMER MILL ROTOR

This is a divisional of co-pending application Ser. No. 354,286, now U.S. Pat. No. 4,504,019 filed on Mar. 3, 1982.

BACKGROUND OF THE INVENTION

This invention relates to hammer mills and, more particularly, to a hammer mill having a capped disc rotor with the caps being attached to each individual disc. The hammers rotate on pins extending between the discs. This patent application is an improvement over U.S. Pat. Nos. 3,482,789 and 3,482,787, which are incorporated herein by reference.

DESCRIPTION OF THE PRIOR ART

Many different types of products have been designed in the past for shredding scrap metal. One of the largest sources of scrap metal is old automobile bodies. To get the metal into scrap form for reuse, it becomes necessary to pulverize, shred or otherwise break the metal into small pieces. In the past, this has been accomplished a number of ways with U.S. Pat. No. 3,482,788 being a typical example. A rotor is located inside of a hammer mill, which rotor is turned by a large motor at a high rate of speed. The rotor consists of a shaft with a plurality of discs being spaced along the shaft. Pins extend through the discs near the outer periphery thereof and have spacers separating each of the individual discs. Hammers are spaced along the pins at locations not occupied by spacers and are free to rotate thereabout. As the rotor rotates at a high rate of speed, the hammers strike the metal being pulverized or shredded. If the hammers strike too hard of an object that is not pulverized or broken in one blow, the hammers are free to rotate about the pin to allow the rotor to continue to rotate. However, this system has problems of excessive wear of the discs.

In an effort to overcome the wear of the discs located on the rotor, protective caps were designed and provided as shown in U.S. Pat. No. 4,056,232. However, these caps have inherent problems that occur during use. Further, the caps were large and bulky and difficult to install. Installation of the caps requires that the pins be removed, the caps inserted in place of the spacers along the pins, and the caps secured in place. This creates excessive weight in the rotor and requires considerably more material. In use, it has been found that the leading edge of the caps would tend to rise up. After the leading edge begins to rise, the caps can rip off causing damage to the pins, discs or rotor. Whenever the caps need to be replaced, it involves a major overhaul job whereby each of the pins have to be removed (many times requiring special pin pullers), the caps cut away from the discs if they are bradded into place, and replaced with new caps. This is a very time consuming job with the caps themselves being quite expensive.

Another type of hammer mill having a rotor assembly utilizes what is commonly called a "spider" rotor. Because the arms of the spider had the same problems with wear as the discs would have in a "disc-type" rotor, the spiders needed some type of protective cap or tip. A typical such spider rotor having a protective cap or tip is shown in U.S. Pat. No. 3,727,848. Again, the hammers freely swing on pins extending through the spider arms, but the spider arms are protected by replaceable caps or tips located on the leading edge of the spider arms. However, the spider-type rotor is less desirable than the disk-type rotor because it normally does not have as many hammers and metal can become lodged between the various spider arms. Spider type rotors are more subject to direct hits than disc-type rotors, which direct hits increase vibrations, shocks and incidents of damage. For example, the spider arm can break away from the shaft. These problems are lessened with the disc-type rotor.

Another typical example of a spider-type rotor having a replaceable cap attached to the pins extending therethrough is shown in U.S. Pat. No. 3,844,494. However, this has the inherent problems that all spider-type rotors have of less capacity and vibration or shock problems.

The prior art for related crusher devices is very old having originally been developed in connection with the crushing of grain products, such as corn. A typical turn-of-the-century type of crusher or pulverizer is shown in U.S. Pat. No. Re. 12,659 issued in 1907. A large rotor is used with discs or plates connected thereto and hammers being swung on pins extending through the discs. However, when the type of crusher or pulverizer as shown in the aforementioned U.S. Pat. No. Re. 12,659 is modified for shredding metal products, many problems that had not occurred before began to occur, such as problems of excessive wear not only on the hammers and on the grinding or crushing surface, but also on the supporting discs themselves.

Another typical early patent is shown in U.S. Pat. No. 589,236 issued in 1897, which shows a spider-type crusher or pulverizer. A whole series of these patents around the turn of the century are either invented by Milton F. Williams of St. Louis, Missouri, or assigned to the Williams Patent Crusher and Pulverizer Company of St. Louis, Mo.

A patent that pictorially shows a shredder-type hammer mill used for shredding car bodies is U.S. Pat. No. 3,545,690, which hammer mill utilizes a spider-type rotor. In recent years, there have been further improvements in the hammers with the use of manganese, which has a tendency to work harden to prevent wear. However, such material has a tendency to be ductile during the period of time that it is work hardening. A patent addressing this particular problem is U.S. Pat. No. 3,738,586.

In the past, a special heat treating or hard surface welding process has been used to coat the outer surface of the discs, which process is very time consuming and expensive.

In the present application, a very simple type of cap that is attached to the disc is provided, which cap can be easily removed and replaced without the necessity of having to pull the pins in the rotor. The pulling of the pins in the rotor is a major job and requires considerable labor and equipment. All of these problems have been overcome with the present invention.

SUMMARY OF THE INVENTION

It is an object of the present invention to provide a hammer-type shredder mill having a capped disc rotor.

It is another object of the present invention to provide a rotor with a removable outer surface formed from a work hardening material, such as manganese, which outer surface may be easily removed and replaced.

It is a further object of the present invention to provide a cap which may be attached to a disc rotor of a metal shredding machine, particularly the type of shredder that may be used to shred automobile bodies.

It is yet another object of the present invention to provide a capped disc rotor for a hammer mill shredding apparatus, which utilizes a dual feed roller and top and bottom discharge, both of which insure maximum capacity with the least amount of energy dissipation.

The present invention is for a shredder of metal products with typical products being used appliances or automobile bodies. For increased capacity, the shredder has both a top and bottom discharge for discharging the metals after shredding. The shredder uses a disc-type rotor that are spaced apart by spacing rings.

Around the outer periphery of the rotor are located pins extending through discs on which spacing rings are provided. Hammers are suspended on the pins at dispersed locations where spacing rings are not located. The hammers are free to rotate around the pins and between contiguous discs. As the rotor turns at a high rate of speed, the centrifugal force extends the hammers outward, which hammers impact on scrap metal being fed into the shredder. The impacting hammers either shred or pulverize the material being fed into the shredder. As the scrap material is being fed into the shredder and broken into pieces by the hammers the scrap material impacts against the discs holding the pins on which the hammers are suspended. The impacting of the metal against the discs tends to wear the outer surface of the discs.

To prevent wear to the outer surface of the discs, a cap made from manganese or a manganese steel alloy (or similar characteristic allow steel) is bolted onto the outer surface of the discs. The discs, which are generally circumferential in nature, have raised portions centered in the middle of each cap. Each end of the caps are overlapping in a shiplap manner with the adjacent cap. Bolts through the caps into the discs physically anchor the caps in position. After running the hammer mill with the capped discs a short period of time, the manganese or austenitic manganese steel is work hardened into position on the discs. Due to the work hardening and the setting of the caps on the discs, normally it is necessary to tighten the bolts a couple of times during the early running of the hammer mill.

The shiplapping of each end of the caps are arranged in such a manner that a sharp leading edge on the cap in the direction of rotation does not exist; therefore, preventing the caps from peeling off due to a wedging of scrap material thereunder. The raised outer portions of the discs (or shoulders) may be made in any particular configuration necessary to hold the cap in position. Also, a tongue-and-groove may be located between the cap and the disc to prevent lateral movement of the cap. Once the cap becomes work hardened in position, there is very little or no need to further tighten the caps in position.

The use of the caps on the discs greatly reduce the need for periodic rebuilding of the discs or the replacement of the discs due to wear. Presently, there is a significant amount of downtime due to rebuilding of discs or replacement of caps anchored to the pins. By use of the present system, there is less downtime and increased capacity from the hammer mill.

As an additional feature, by using a dual feed roller which is anchored on a pivot point near the inlet for the hammer mill, which dual feed roller may pivot upward onto an automobile body being fed into the shredder, a more uniform feeding of an automobile body is provided. The first roller crushes the automobile body inward with the second roller completing the crushing. As an automobile body is fed into the shredder and is impacted by the hammers, knobs on the rollers keep too much of the automobile body from feeding into the shredder at one time, thereby insuring a more uniform feed into the shredding apparatus and maximizing the efficiency of the shredder. By having a more uniform feed, it is not necessary to have as much power, thereby increasing the efficiency of the hammer mill.

DESCRIPTION OF THE PREFERRED EMBODIMENT

Figure 1:
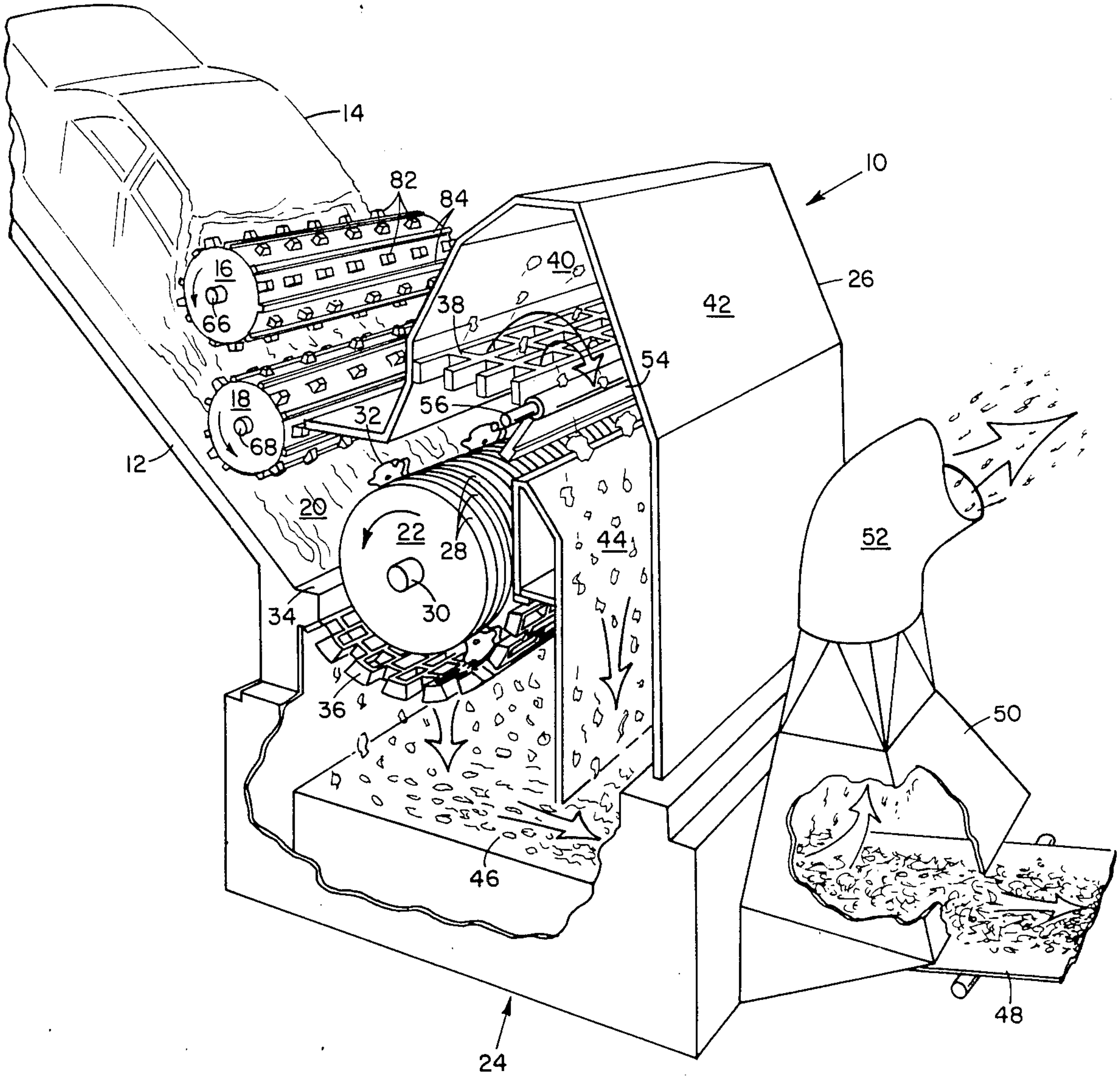
FIG. 1 is a pictorial representation of a hammer mill utilizing the present invention with a portion of a housing of the hammer mill being cut away for illustration purposes.
Figure 2:
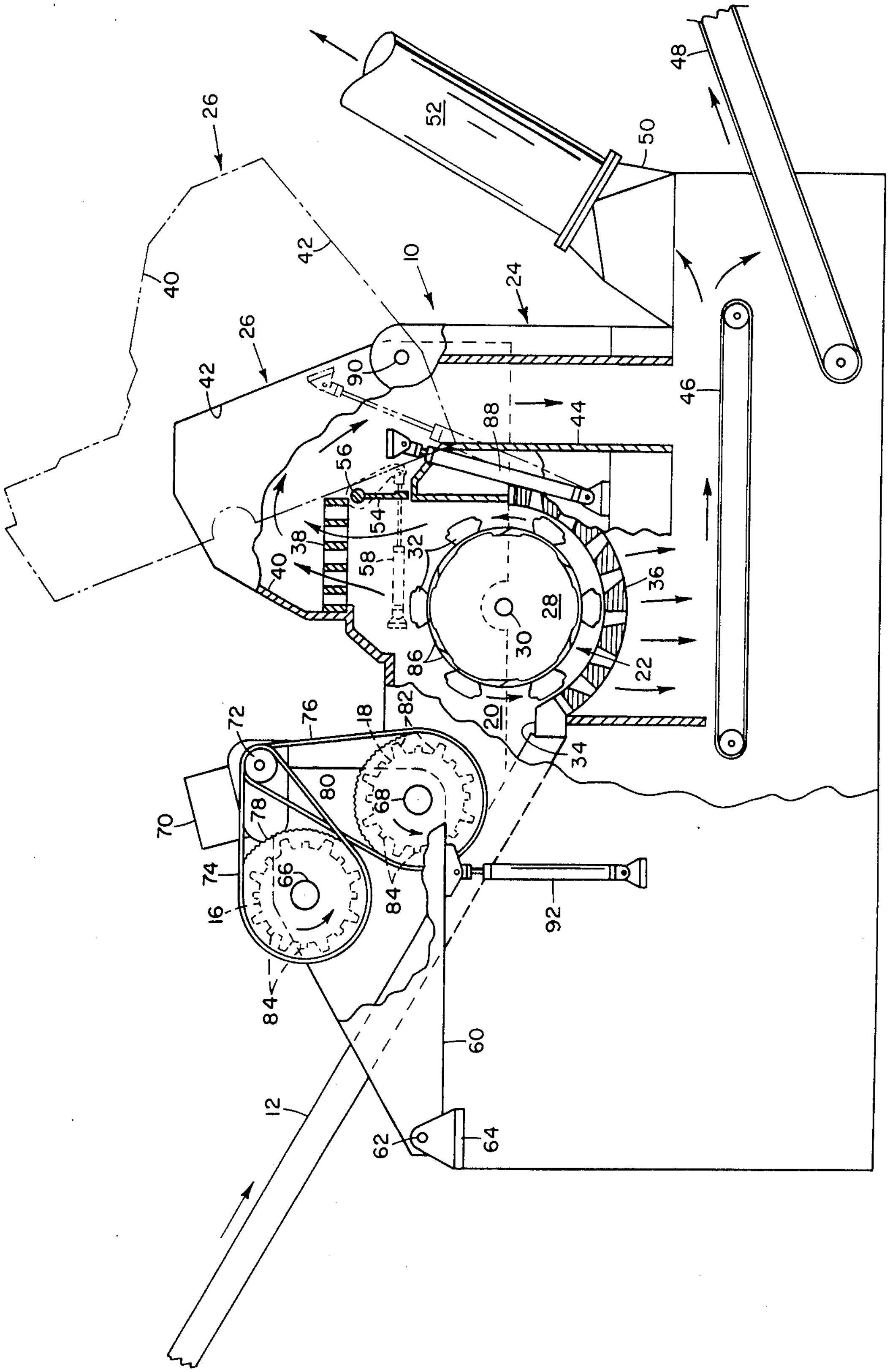
FIG. 2 is a pictorial side elevation of a hammer mill utilizing the present invention with a portion of the housing being cut away for illustration purposes, and illustrating the raising of a hood of the housing for access to a rotor contained therein.

Referring now to FIG. 1 of the drawings in combination with FIG. 2, a hammer mill is shown represented generally by reference numeral 10. The hammer mill 10 has a feed ramp 12 through which materials to be shredded, such as automobile body 14, are fed into the hammer mill 10. Feed rollers 16 and 18 feed the automobile body 14 into the hammer mill 10 through opening 20.

The hammer mill 10, which has a rotor 22 located therein turning at a high rate of speed from a drive connection to a motor (not shown), is enclosed by housing 24. The housing 24 has a hood 26 which covers the upper portion of the rotor 22. The rotor 22 has a plurality of discs 28 mounted on a shaft 30 that is turned by the power source (not shown). Located intermittently between the discs 28 are hammers 32, which hammers 32 are free to rotate as well as the rotation of the rotor 22.

As the rotor 22 rotates and scrap metal, such as automobile body 14, are fed into the hammer mill 10, the hammers 32 impact against the automobile body 14. Between the hammers 32 and anvil surface 34, the automobile body 14 is shredded into small pieces. The shredded material is discharged from the rotor area through either lower grate 36 or upper grate 38. The lower grate 36 has a finer mesh than the upper grate 38. However, the impacting of the hammers 32 against the material being shredded will knock some of the material upward through upper grate 38, which shredded material is reflected off of walls 40 and 42 of the hood 26 and falls downward behind dividing wall 44. The material which has been shredded that either falls through lower grate 36, or is knocked through upper grate 38 and falls behind dividing wall 44 lands on a conveyor 46. Conveyor 46 moves the shredded material to the right as shown in FIG. 1 and dumps the material on another conveyor 48. A suction hood 50, which is connected to a vacuum source (not shown), draws the lightweight particles (such as plastics, foam, dirt, etc.) up through conduit 52 as the shredded material is dumped from conveyor 46 on the conveyor 48. Conveyor 48 takes the heavier shredded particles away for further processing.

In the event that some portions of the material to be shredded are broken off in large chunks that are difficult or impossible to be discharged through lower grate 36 or upper grate 38, gate 4 contained on gate pin 56 may be opened (as shown in FIG. 1) to discharge the larger objects therethrough. The operating mechanism for the gate 54 may be of any conventional means, such as a hydraulic cylinder 58 as shown on FIG. 2.

Referring now to FIG. 2, the same numerals as used in describing FIG. 1 will again be used. However, in FIG. 2, material to be shredded is not being fed into the hammer mill 10, even though arrows indicate the direction the material being shredded as well as the direction of the parts for the hammer mill 10 will be moving.

Referring to the feed rollers 16 and 18, they are both mounted on a support bracket 60 (a portion of which is cut away) that is pivotally connected by pin 62 to anchor support 64. Support bracket 60, which is located on either side of the feed ramp 12, has a shaft 66 extending thereacross for supporting feed rollers 16 and a shaft 68 extending thereacross for supporting feed roller 18, respectively. Also carried on the support bracket 60 is a drive mechanism 70 (such as a motor), which drive mechanism 70 is used to turn drive sprocket 72. Drive sprocket 72 through chains 74 and 76 turns sprockets 78 and 80, respectively. Because sprockets 78 and 80 are connected to shafts 66 and 68, respectively, they likewise turn feed rolers 16 and 18, respectively. While the feed rollers 16 and 18 turn on shafts 66 and 68, respectively, both may pivot about pin 62 in a manner as will be further described in conjunction with FIG. 3. The rollers 16 and 18 have longitudinal ribs 84 extending thereacross, as well as intermittent spikes for digging into the material to be shredded.

As the rotor 22 turns during actual operation of the hammer mill 10, the hammers 32 sling outward in a manner as shown in FIG. 2. On the individual discs 28 of the rotor 22 are located caps 86 around the outer periphery thereof. These caps will be explained in further detail in connection with FIGS. 4–10. The gate 54 is held in its closed position by hydraulic cylinder 58 until such time as gate 54 needs to be opened to discharge large items from the hammer mill 10. If access is needed to the rotor 22, the hood 26 may be raised by activating hydraulic cylinder 88 to the position as shown in reference lines. Naturally this would first require removing any bolts or other securing devices (not shown) that would hold the hood 26 in its normal operating position. Hood 26 will rotate upward upon activation of the hydraulic cylinder 88 about pin 90. The raising of the hood 26 allows access to the internal portion of the hammer mill 10 for any repairs or other work that may need to be performed.

Figure 3:
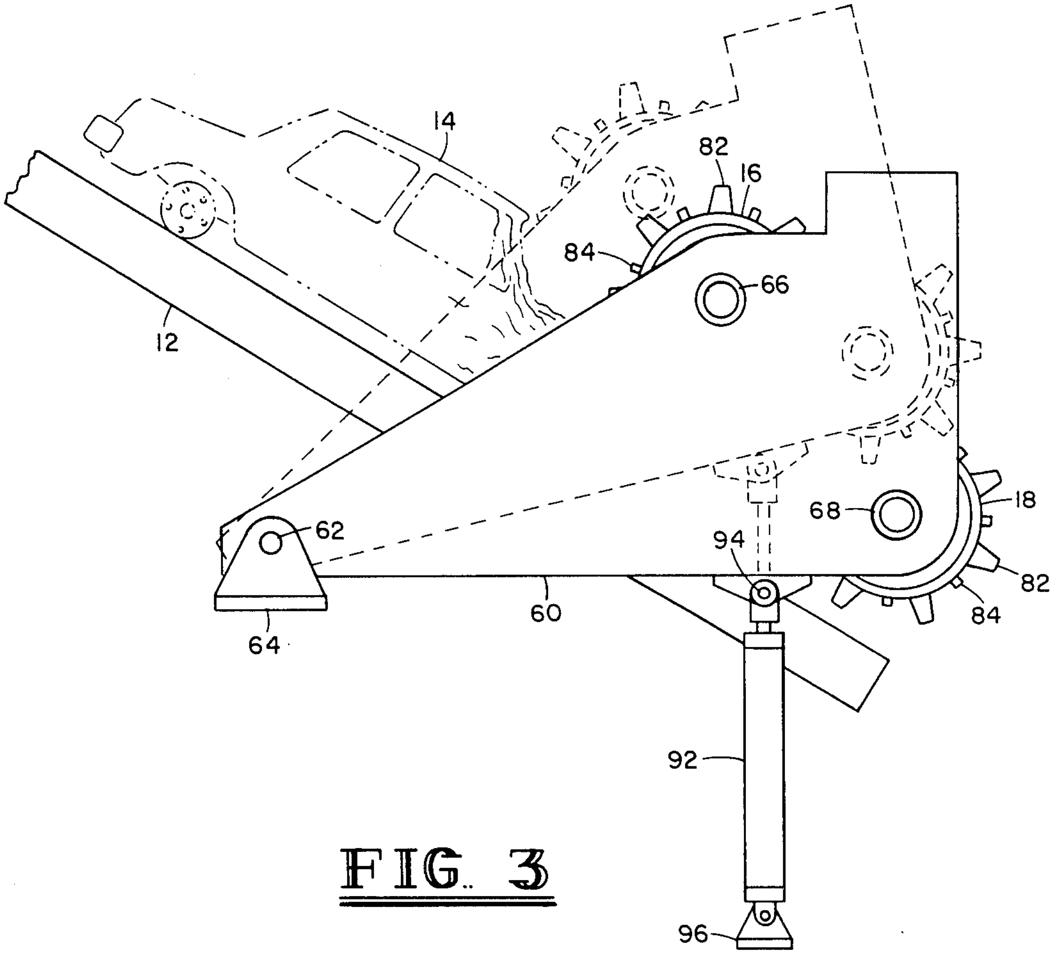
FIG. 3 is a pictorial side elevation view of a hammer mill utilizing dual feeder rollers.

Referring now to FIG. 3, the feed rollers 16 and 18 are explained in further detail. As the automobile body 14 is fed along feed ramp 12, feed roller 16 through the spikes 82 and ribs 84 will grab the automobile body 14. Due to the downward pulling action of hydraulic cylinder 92 (or the sheer weight of the rollers 16 and 18 themselves), the feed roller 16 will tend to crush the automobile body 14. Feed roller 18 tends to further crush the automobile body 14. The ribs 84 and spikes 82 prevent too much of the automobile body 14 from feeding into the hammer mill 10 at one time. While the feed rollers 16 and 18 are turning on their respective shafts 66 and 68, if the feed rollers 16 or 18. have problems crushing the automobile body 14 (or any other material being fed into the hammer mill 10), they may pivot about pin 62 with the entire bracket support 60 rotating upward as shown in reference numerals to provide extra clearance. When this occurs, hydraulic cylinder 92 which is attached to bracket support 60 by means of pin 94 and to an anchor support 96 tends to pull the bracket 60 and its respective feed rollers 16 and 18 downward. This allows some flexibility to the material being fed into the hammer mill while simultaneously providing a compression or compacting of the material to be shredded. It is much easier to compact material, such as automobile bodies, in steps by two rollers, such as feed rollers 16 and 18, than it is to feed the material into the hammer mill 10 by a single stationary feed roller.

Figure 4:
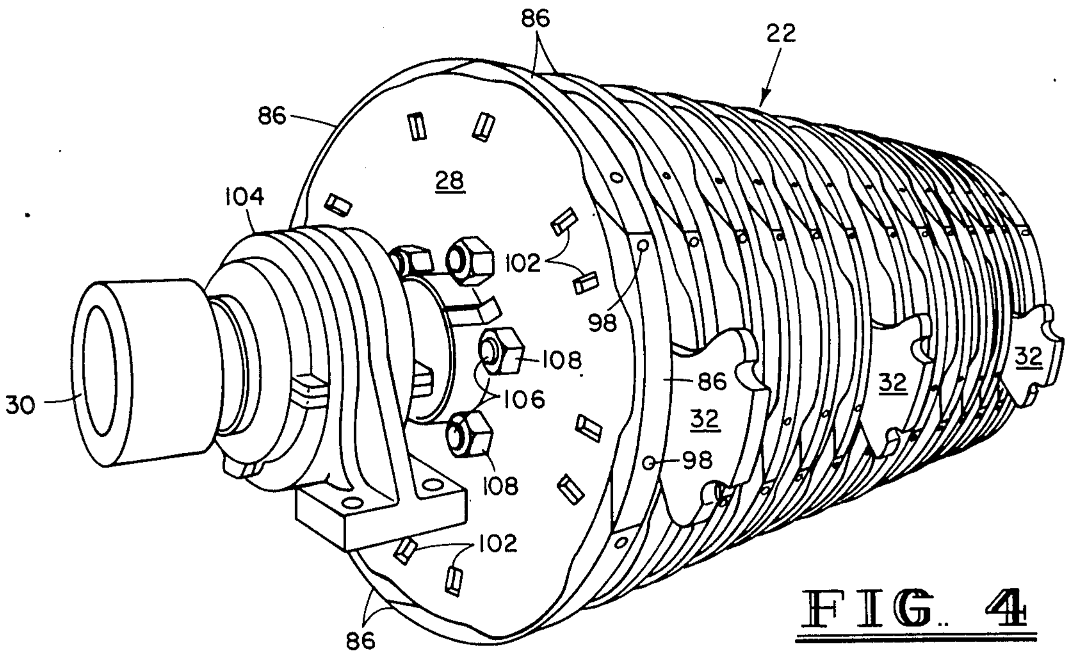
FIG. 4 is a perspective view of a rotor having capped discs thereon prior to installation.

Referring now to FIG. 4 of the drawings, the rotor 22 is shown in further detail. In FIG. 4, the rotor 22 is not installed with the hammers 32 on hammer pins 32 (described subsequently herein) being partially extended for pictorial purposes. The discs 28 each have a plurality of the caps 86 located therearound with a typical number being either four or six depending upon the type of rotor. The caps 86 have recessed bolt holes 98 extending radially inward, which recessed bolt holes 98 align with radial bolt holes 100 (not shown in FIG. 4) of discs 28. Intersecting the radial bolt holes 100 in the discs 28 are slots 102 in which nuts can be attached to bolts (shown hereinafter) extended through recessed bolt holes 98 and radial bolt holes 100 to secure the caps 86 in position.

The entire rotor 22 is turned by means of the shaft 30, which is held in position by bearings 104 located on either end of the shaft 30. The discs 28 and any end plates (shown in FIG. 5) that may be used are held in position by disc bolts 106 and nuts 108. The disc bolts 106 extend through all of the discs 28 that are mounted on the shaft 30 for the rotor 22.

Figure 5:
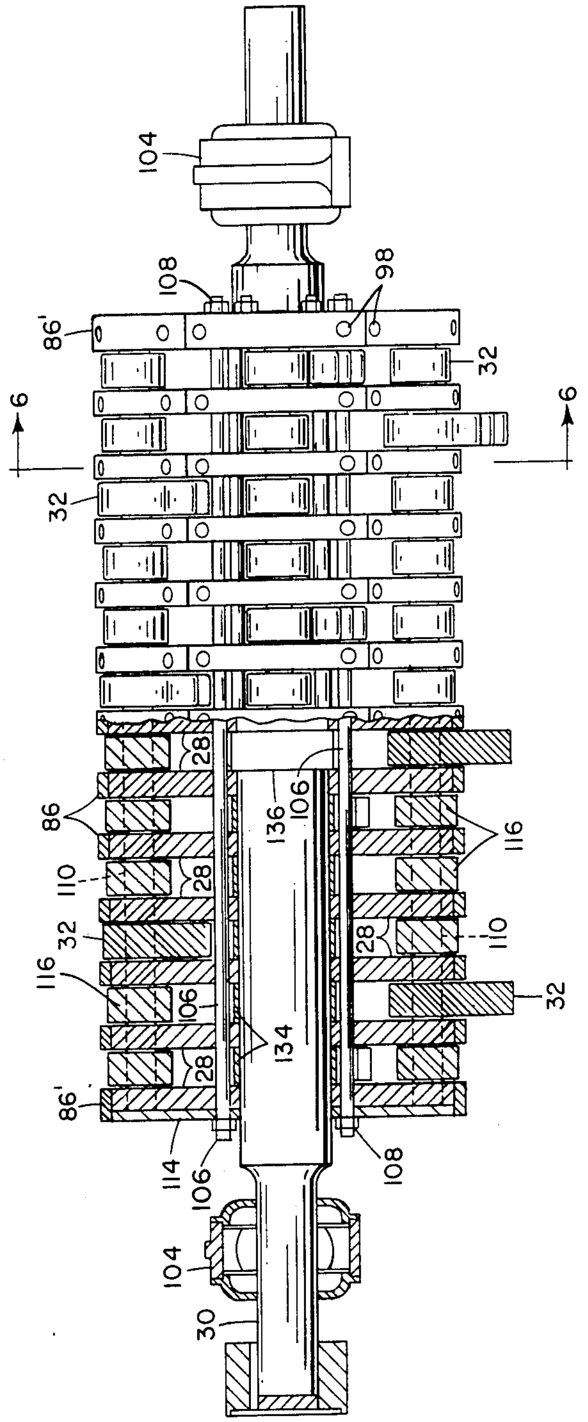
FIG. 5 is a front elevation view of FIG. 4 with a portion being sectioned along section lines 5—5 of FIG. 6.
Figure 6:
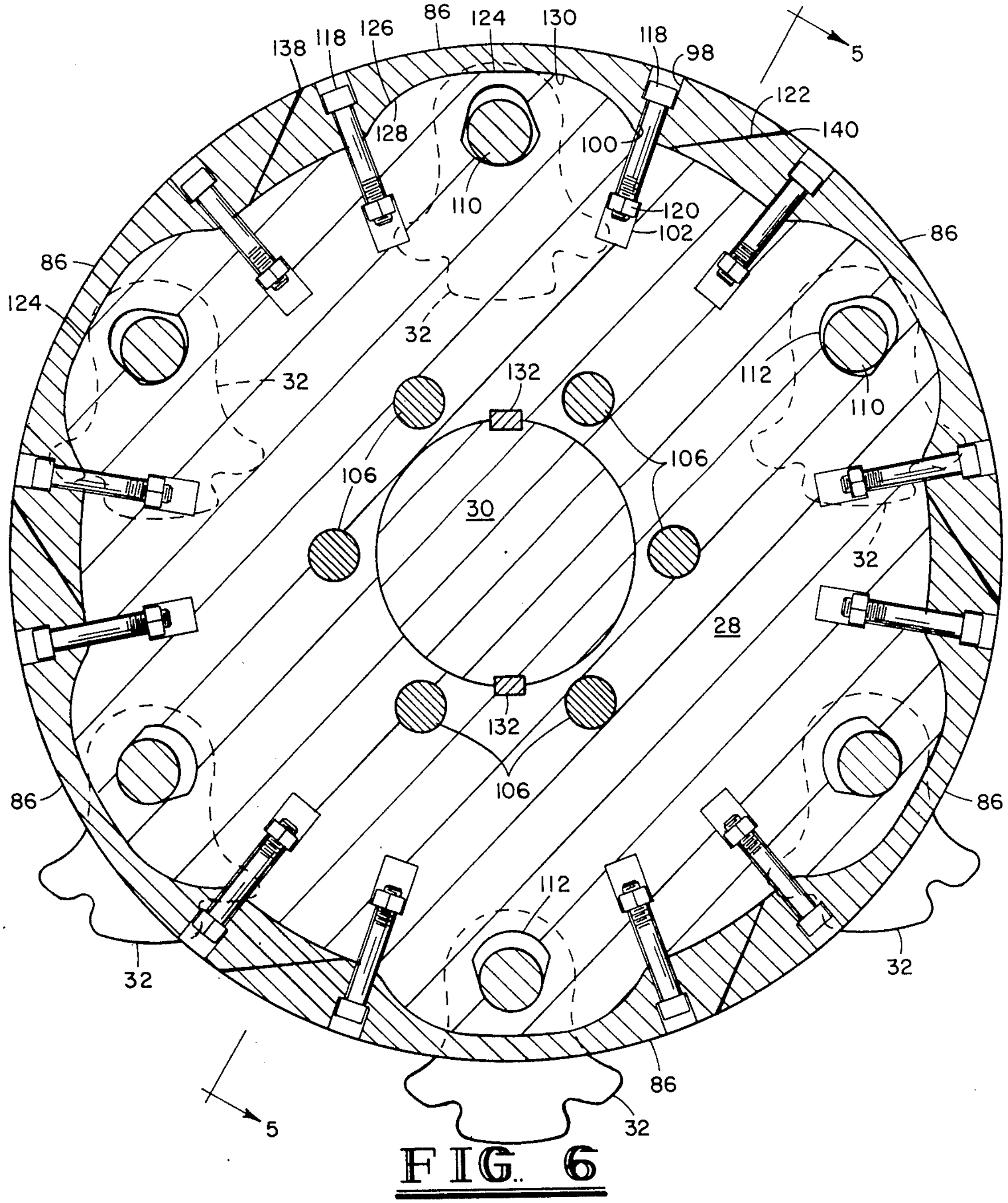
FIG. 6 is a section view FIG. 5 along section lines 6—6.

Referring now to FIG. 5, a partially sectioned elevated side view of the rotor 22 as shown in FIG. 4 is illustrated. The disc bolts 106 can be seen to extend through all of the discs 28 with the nuts 108 being secured to either end thereof. Referring to FIGS. 5 and 6 in combination, it is shown that hammer pins 110 extend through holes 112 near the outer circumference of the discs 28. The hammer pins 110 may be held in position by any convenient means, such as end plates 114, which abut against the respective ends of the hammer pins 110 and are held in position by disc bolts 106 and nuts 108. However, it should be realized that any of a number of methods could be used to secure the hammer pins 110 in position. If end plates 114 are used, the caps 86' as located on the end discs should be wider to also cover the end plates 114.

Located between the various discs 28 are pin spacers 116, which both protect the hammer pins 110 and provide the proper spacing between the discs 28. At predetermined locations along the hammer pins 110, the pin spacer is eliminated and a hammer 32 is inserted. The hammer 32 is free to rotate on the hammer pin 110. Caps 86 cover the entire periphery of the discs 28 as can be more clearly seen in FIG. 6.

Figure 10:
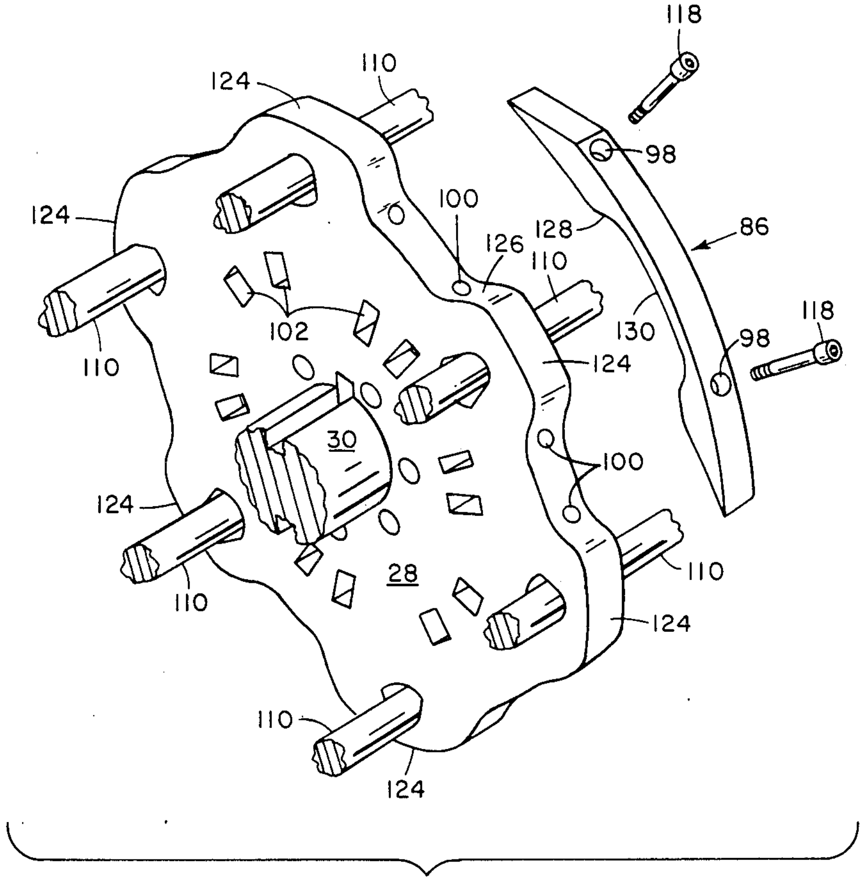
FIG. 10 is an exploded perspective view of a single disc as installed with a cap exploded therefrom.

In FIG. 6, which is a cross-sectional view of FIG. 5 along section lines 6—6, a better understanding of the connection of the caps 86 to the discs 28 can be obtained. It is suggested that FIG. 6 be viewed in conjunction with the partial exploded view as shown in FIG. 10. The caps 86 are attached by bolts 118 through the recessed bolt holes 98 and radial bolt holes 100 to nuts 120 located in slots 102. Each of the caps 86 has at least one recessed bolt hole 98 located at either end thereof for securing to the discs 28. Between each of the respective caps 86 are slanting cuts 122 so that each cap 86 will fit in with the adjoining cap in a shiplap manner. Each cap 86 covers a radial arc of the discs 28 until the entire disc 28 is covered by caps 86. The caps 86 are made from a work hardening type of material, such as manganese or a manganese alloy. A typical material would be an austenitic manganese steel, or other type of alloy steel having similar characteristics, from which the cap 86 could be made. The longer a work hardening material is used, the harder the material becomes. However, during the work hardening process, the material (caps 86) tends to be ductile and must be securely fastened into position by the bolts 118. Since the bolts 118 have an Allen type head and the nuts 120 are accessible, or are held in position by the sides of slots 102, the bolts 118 may be tightened after a short period of use.

Also as can be seen in FIG. 6, the holes 112 for the hammer pins 110 are larger than necessary for the hammer pins 110 to extend therethrough. When in operation, the hammer pins 110 with the hammers 32 will extend radially outward; however, the enlarged hole 112 will allow the hammer pin 110 to bounce back to a slight degree in the event that an exceptionally difficult item to shred is struck by the hammers 32.

To prevent the entire impact force as exerted on caps 86 by shredded materials during the shredding process from being borne by bolts 118, an outward protrusion 124 of the discs 28 is provided at every location for hammer pins 110. By having the outward protrusion 124, the leading edge or shoulder 126 of the discs 28 will absorb the impact as received by the shoulder 128 of cap 86 created by undercut 130. It should be realized that undercut 130 of cap 86 should match the outward protrusion 124 of discs 28. It should be realized (as will be explained in more detail subsequently) that the undercut 130 of the cap 86 or the outward protrusion 124 of the discs 28 may vary, but the most important aspect is to have a leading edge 126 of the discs 28 which may receive the impact against the cap 86 via shoulder 128.

To keep the discs 28 from spinning on the shaft 30, keys 132 are located therebetween. Also, internal spacers 134 (see FIG. 5) are located between respective discs 28 except between the center disc where the shaft 30 is enlarged to provide shoulder 136 as shown in FIG. 5.

By having the caps 86 connected as shown in FIG. 6 to the discs 28, the outward leading edge 138 always forms an obtuse angle to the direction of rotation of the rotor 22. Likewise, the outward trailing edge 140 of the cap 86 always forms an acute angle. This prevents any materials from getting wedged under the leading edge of the cap 86 which would have a tendency to tear the cap 86 off of the discs 28. This particular problem has occurred before in previously designed capped disc rotors.

Figure 7:
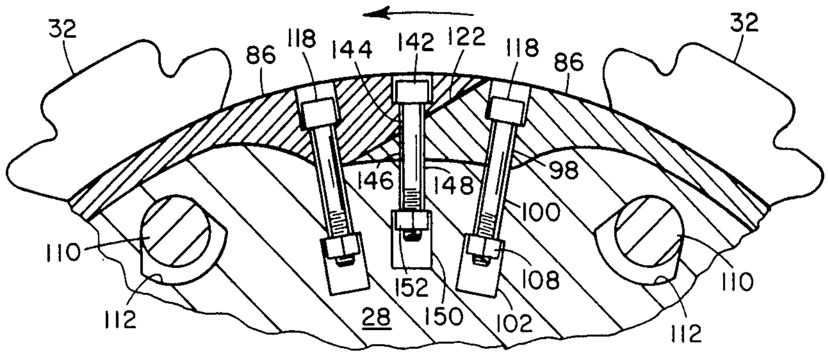
FIG. 7 is a partial sectional view of a disc and caps of a rotor in operation illustrating an alternative method of connection of the caps.

Referring to FIG. 7, a partial sectional view of a capped disc during operation is illustrated with the hammers 32 being fully extended due to the rotational force of the rotor 22. The disc 28 has caps 86 attached thereto. The hammer pins 110 are extended radially outward inside of holes 112 due to the rotational inertia. In addition to the previously described bolts 118 extending through recessed bolt holes 98 and radial bolt holes 100 to cross slots 102 for connecting to nuts 108, FIG. 7 further illustrates the use of center bolt 142 to protect the slanting cut 122 between adjoining caps 86. The center bolt 142 has a recessed bolt hole 144 that aligns with radial bolts hole 146 in a lower cap 86 and with radial bolt hole 148 in the discs 28. Again, a slot 150 intersects the radial bolt hole 148 so that a nut 152 can be attached to center bolt 142. By use of the center bolt 142 in addition to the previously described bolts 118, additional integrity is provided to the cap 86 to insure that caps 86 do not separate during use.

Figure 8:
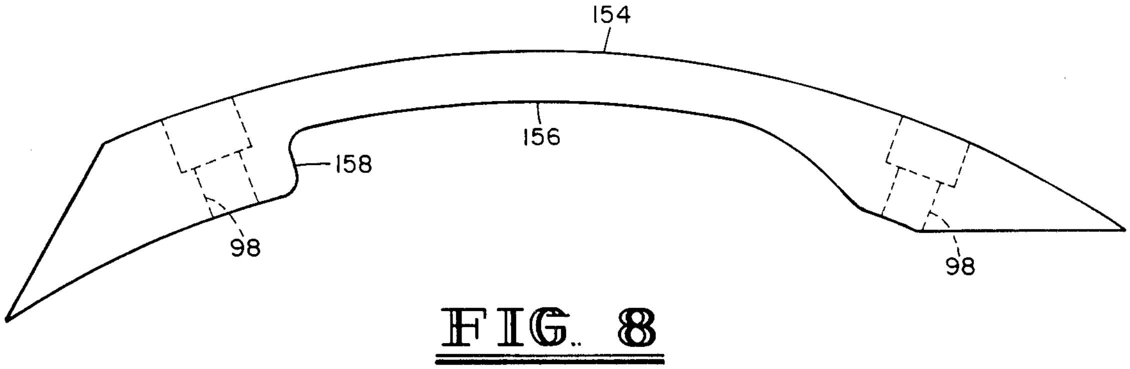
FIG. 8 is a side elevation view of an alternative cap.

Referring now to FIG. 8, a modified cap 154 is shown. The modified cap 154 again has recessed bolt holes 98 located in either end thereof for accepting the bolts 118 as previously described. However, the undercut 130 has been replaced with undercut 156 that has rounded front shoulder 158 therein. The rounded front shoulder 158 provides more of an impact surface between the modified cap 154 and the discs (not shown in FIG. 8) to help eliminate the force from shredded material from being exerted on the bolts 118. Obviously, the discs used in conjunction with the modified cap 154 would have to be likewise contoured to provide a matching rounded front shoulder to abut against rounded front shoulder 158 of modified cap 154.

Figure 9:
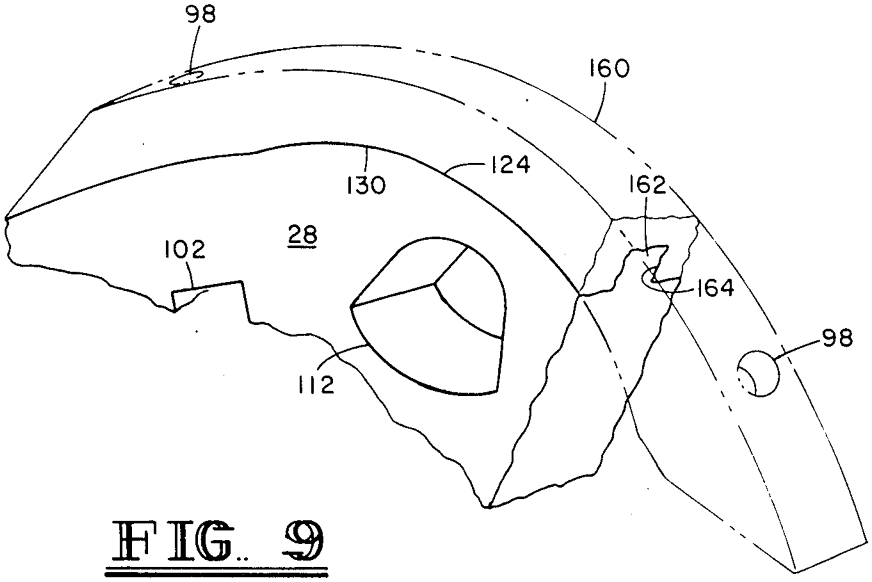
FIG. 9 is a partial pictorial and sectional view illustrating an alternative cap and disc.

Referring now to FIG. 9, a second modified cap 160 is shown. The modified cap 160 is attached to the discs 28 in the normal manner by bolts extending through recessed bolt holes 98 as previously described. Also, the discs 28 have an outward protrusion 124 and the modified cap 160 has a matching undercut 130 to accept the outward protrusion 124. However, between the modified cap 160 and the discs 28 are located a tongue 162 and groove 164 to form a tongue and groove connection. While the tongue 162 is shown as part of the discs 28 and the groove 164 is formed as part of the modified cap 160, obviously these can be reversed. The object is to provide an internal radial overlapping between the modified cap 160 and the discs 28 to prevent the modified cap 160 from moving to the right or left of the discs 28. During the period of time that the modified cap 160 is work hardening in position, it has a tendency to be ductile and may bend to the right or left of the discs 28. By the use of the tongue and groove arrangement as shown in FIG. 9, or any other suitable radial overlapping, the bending or shaping of the modified cap 160 has been eliminated. While this has not been shown to be a particularly significant problem, such an overlapping arrangement could prevent the problem from occurring.

While it is envisioned that the caps 86 as previously described hereinabove will normally be installed on new rotors for hammer mills, rotors for existing hammer mills can be easily modified to provide the capped disc feature as described hereinabove. The rotor 22 would have to be removed from the hammer mill 10 and the discs 28 removed from the shaft 30. The discs 28 would then either be replaced with discs as described hereinabove or reshaped to the same general shape as the discs described hereinabove. The reshaped discs 28 would have to have a means for attaching the cap 86 thereto, such as the radial bolt holes 100 and slots 102. Thereafter, the caps 86 as previously described would be attached to the discs 28 and the discs 28 reinstalled on the shaft 30. Then the entire rotor 22 would be reinstalled in the hammer mill 10. Approximately two or three times during the initial running of the hammer mill 10, if bolts 118 are used for attaching the caps 86 to the discs 28, then the bolts 118 will have to be tightened. The reason for tightening the bolts 118 is because the caps 86 are work hardening and fitting into position, during which time they have a tendency to be malleable or ductile.

We claim:

1. A method of retrofitting a hammer mill rotor having conventional discs initially mounted thereon, comprising the following steps:
- removing said rotor from a hammer mill;
- removing said conventional discs from a shaft of said rotor;
- manufacturing modified discs which are generally circular and have outward protrusions thereon;
- forming in said modified discs a means for attaching work hardening caps thereto;
- attaching said caps to said modified discs via said attaching means, said caps overlapping said outward protrusions of said modified discs to form generally circular capped discs with a diameter generally the same as said conventional discs;
- installing said modified discs on said shaft; and
- reinstalling said rotor in said hammer mill.

2. A method of retrofitting as recited in claim 1 wherein said attaching of said caps includes shiplapping of said caps end-to-end to have an obtuse leading outer edge and an acute trailing outer edge.

3. A method of retrofitting as recited in claim 1 wherein said forming step includes drilling holes in said modified discs and cutting cross slots in said modified discs to intersect said holes.

4. A method of retrofitting as recited in claim 3 wherein said attaching step includes drilling countersunk holes in said caps to match said holes in said modified discs to bolt said caps to said modified discs.

5. A method of retrofitting as recited in claim 4 comprising the following additional steps:
- running said hammer mill;
- tightening said bolts after said running; and
- repeating the preceding said running and tightening steps.

6. A method retrofitting a hammer mill rotor having conventional discs initially mounted thereon, comprising the following steps:
- removing said rotor from a hammer mill;
- removing said conventional discs from a shaft of said rotor;
- reshaping said conventional discs to modified discs that are generally circular and have outward protrusions thereon;
- forming in said modified discs a means for attaching work hardening caps thereto;
- attaching said caps to said modified discs via said attaching means, said caps overlapping said protrusions of said modified discs to form generally circular capped discs with a diameter generally the same as said conventional discs;
- installing said modified discs on said shaft; and
- reinstalling said rotor in said hammer mill.

7. A method of retrofitting as recited in claim 6 wherein said attaching of said caps includes shiplapping of said caps end-to-end to have an obtuse leading outer edge and an acute trailing outer edge.

8. A method retrofitting as recited in claim 6 wherein said forming step includes drilling holes in said modified discs and cutting cross slots in said modified discs to intersect said holds.

9. A method of retrofitting as recited in claim 8 wherein said attaching step includes drilling countersunk holes in said caps to match said holes in said modified discs to bolt said caps to said modified discs.

10. A method or retrofitting as recited in claim 9 comprising the following additional steps:
- running said hammer mill;
- tightening said bolts after said running; and
- repeating the preceding said running and tightining steps.

11. A method of retrofitting a hammer mill rotor having conventional discs initially mounted thereon, comprising the following steps:
- removing said rotor from a hammer mill;
- removing said conventional discs from a shaft of said rotor;
- obtaining modified discs which are generally circular, have outward protrusions thereon, and have bolt holes therein for attaching work hardening caps thereto;
- attaching said caps to said modified discs, said caps overlapping said outward protrusions of said modified discs to form generally circular capped discs with a diameter generally the same as said conventional discs;
- installing said modified discs on said shaft; and
- reinstalling said rotor in said hammer mill.

12. A method of retrofitting a hammer mill rotor having conventional discs initially mounted thereon, comprising the following steps:
- removing said rotor from a hammer mill;
- removing said conventional discs from a shaft of said rotor;
- obtaining modified discs which are generally circular, have outward protrusions thereon, and have caps attached thereto, said caps overlapping said outward protrusions of said modified discs to form generally circular capped discs with a diameter generally the same as said conventional discs;
- installing said modified discs on said shaft; and
- reinstaliing said rotor in said hammer mill.

13. A method of retrofitting a hammer mill rotor having conventional discs initially mounted thereon, comprising the following steps:
- removing said rotor from a hammer mill;
- removing said conventional discs from a shaft of said rotor;
- reshaping said conventional discs to modified discs that are generally circular and have outward protrusions thereon;
- forming bolt holes in said modified discs for attaching work hardening caps thereto;
- attaching said caps to said modified discs, said caps overlapping said protrusions of said modified discs to form generally circular capped discs with a diameter generally the same as said conventional discs;
- installing said modified discs on said shaft; and
- reinstalling said rotor in said hammer mill.

* * * * *